United States Patent [19]

Petrelli

[11] Patent Number: 5,000,333
[45] Date of Patent: Mar. 19, 1991

[54] CONTAINER FOR THE WINDSHIELD WASHING LIQUID OF A CAR

[75] Inventor: Luigi Petrelli, Legnano, Italy

[73] Assignee: Alfa Romeo Auto S.p.A., Naples, Italy

[21] Appl. No.: 831,453

[22] Filed: Feb. 20, 1986

[30] Foreign Application Priority Data

Mar. 1, 1985 [IT] Italy .............................. 20964/85[U]

[51] Int. Cl.$^5$ .............................................. B05B 3/18
[52] U.S. Cl. ................................. 220/890; 239/284.1; 239/284.2
[58] Field of Search ............... 220/1 R, 72, 83, 85 H, 220/DIG. 13, 18; 215/1 C; 239/284.1, 284.2; 224/273, 311, 42.42

[56] References Cited

U.S. PATENT DOCUMENTS

| | | | |
|---|---|---|---|
| 3,098,633 | 7/1963 | Price | 220/1 R X |
| 3,757,984 | 9/1973 | Barton | 215/1 C X |
| 4,161,287 | 7/1979 | Brown | 239/284.1 |
| 4,324,363 | 4/1982 | Rauen, Jr. | 239/284.2 |
| 4,453,895 | 6/1984 | Hank et al. | 239/284.1 X |
| 4,676,517 | 6/1987 | Tamura | 220/85 S X |

Primary Examiner—Steven M. Pollard
Attorney, Agent, or Firm—Charles E. Brown; Charles A. Brown

[57] ABSTRACT

Container for the windscreen washing liquid of a car, being provided with a seat for the housing of car accessory devices, as well as with fasteners associated to it for the fastening of said accessory devices on the container in correspondence of said seat.

2 Claims, 4 Drawing Sheets

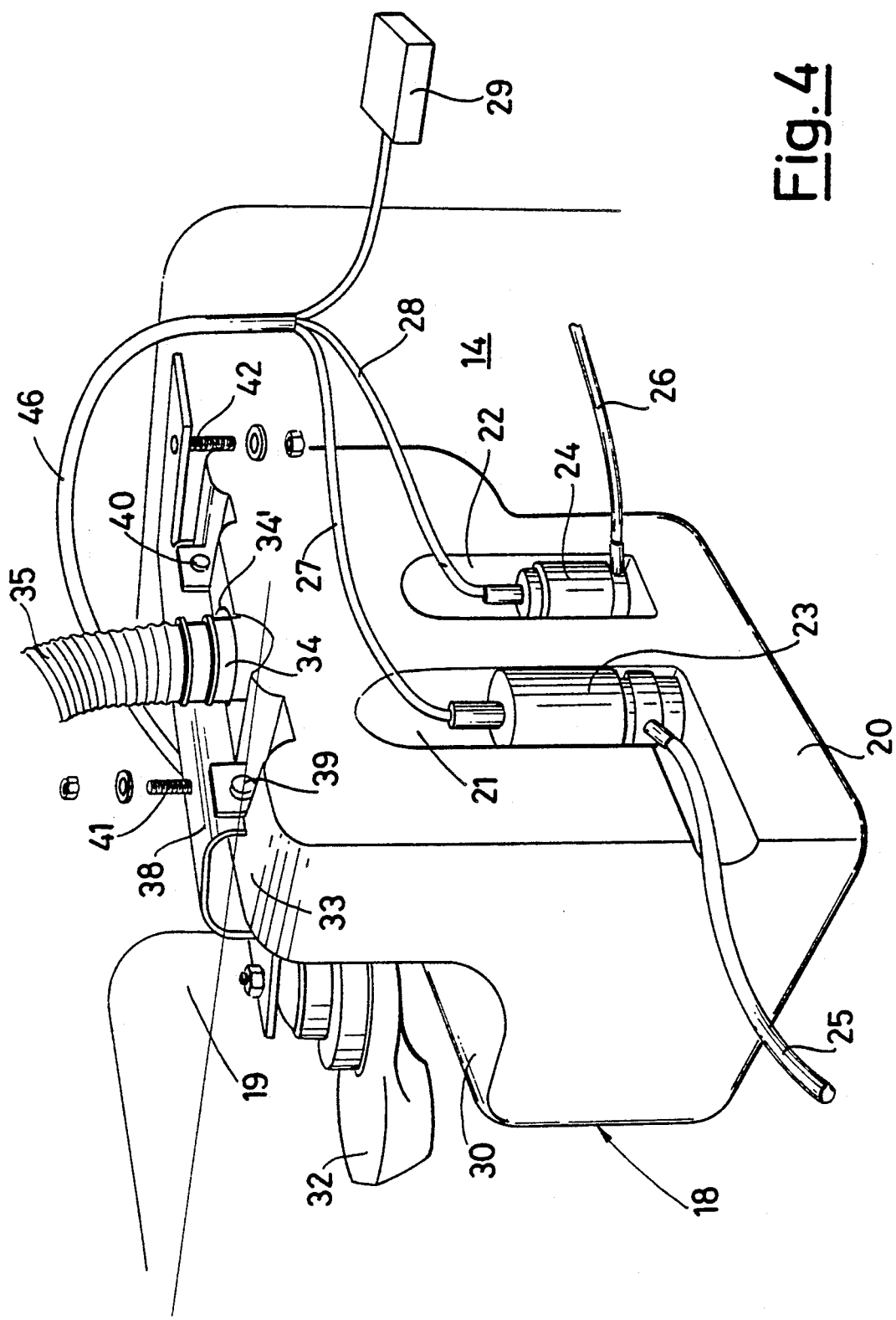

CONTAINER FOR THE WINDSHIELD WASHING LIQUID OF A CAR

The present invention relates to a container for the windscreen washing liquid of a car.

In many cars, the windscreen washing liquid for the spray nozzles of the windscreen and possbily of the head lamps is contained in a container or small tank of semi-rigid plastic, housed inside the engine bay.

But in some cases the room available inside the engine bay is very small, also due to the presence of various accessory devices, and installing a container which is of rather big size, especially if it must contain also the head lamp washing liquid, results difficult.

One purpose of the invention is to provide a container for the windscreen washing liquid of a car, the installation of which results simplified, even if it is of relatively big size.

Another purpose of the invention is a container for the windscreen washing liquid suitable to be mounted in the car in a zone not otherways useable, and not easily accessible.

The container according to the invention is characterized in that it is provided with a seat for the housing of preselected car accessory devices, such as the horns of the hooters, as well as fasterners associated to the container for the fastening of said accessory devices on the container in correspondence of said seat. Moreover, the container may be provided with a wall provided with at least one recess to the purpose of housing at least one windscreen washing liquid suction pump.

Thus, the container according to the invention constitutes a small sub-unit, in which the pump and the accessory devices are pre-mounted; this simplified the installation of the container, in that the incorporation with certain accessory devices creates a set more easily installable in the car, besides simplifying the mounting operations.

Advantageously, the whole sub-unit can be placed inside a recess of one of car's wheel boxes, allowing a farily good simplifying in the bodywork trimming, because in the assembly line just constraining the sub-unit to car's body and carrying out the hose and electrical connections is necessary.

Characteristics and advantages of the invention shall be now illustrated with reference to attached drawings 1–4, wherein to non-limiting exemplifying purposes a preferred embodiment of the same invention is shown.

FIG. 4 is an enlarged rear perspective view of the container of FIG. 3.

Figure 1:
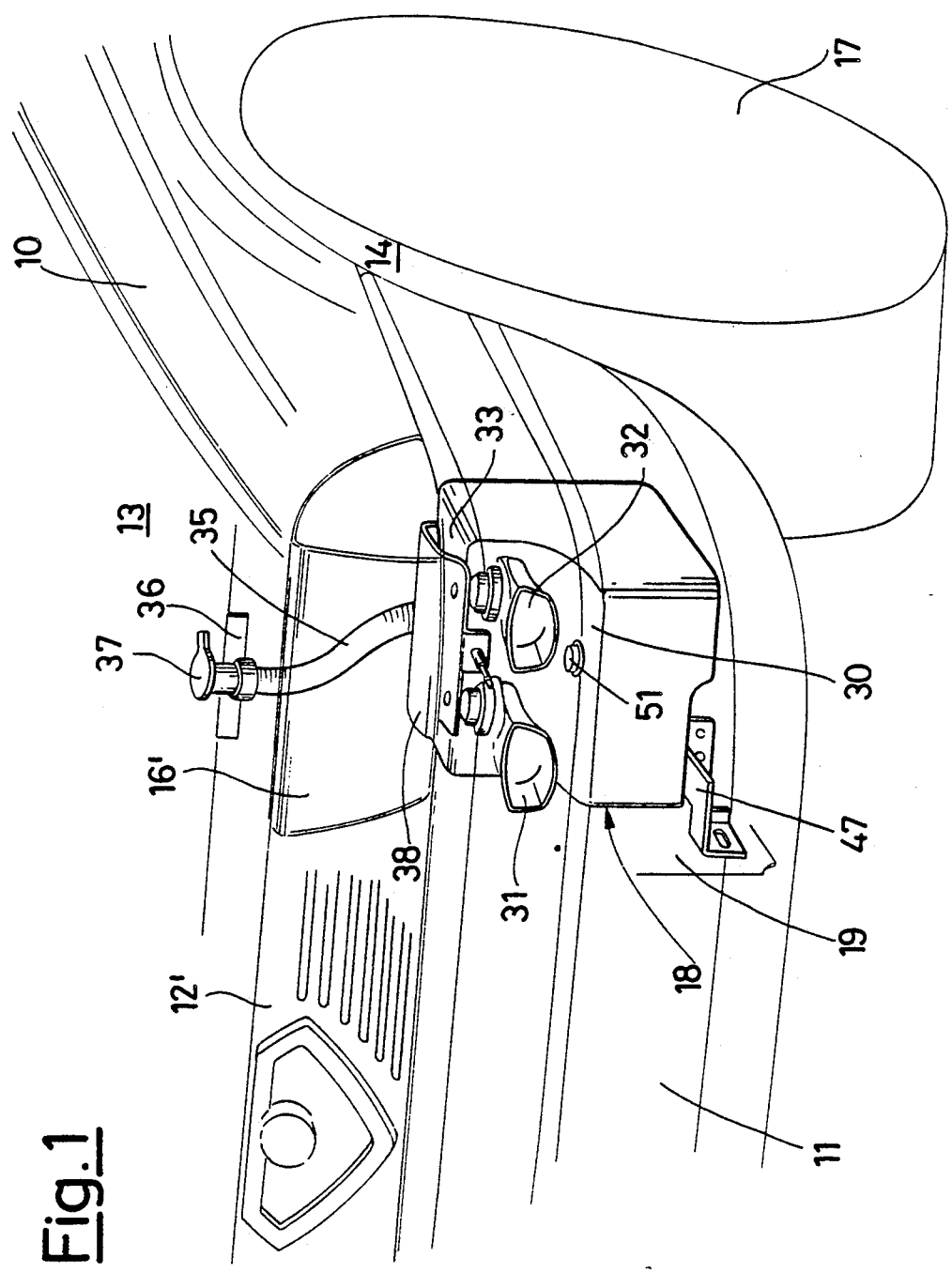
FIG. 1 is a substantially front perspective cutaway of a car provided with a container implemented according to the invention.
Figure 3:
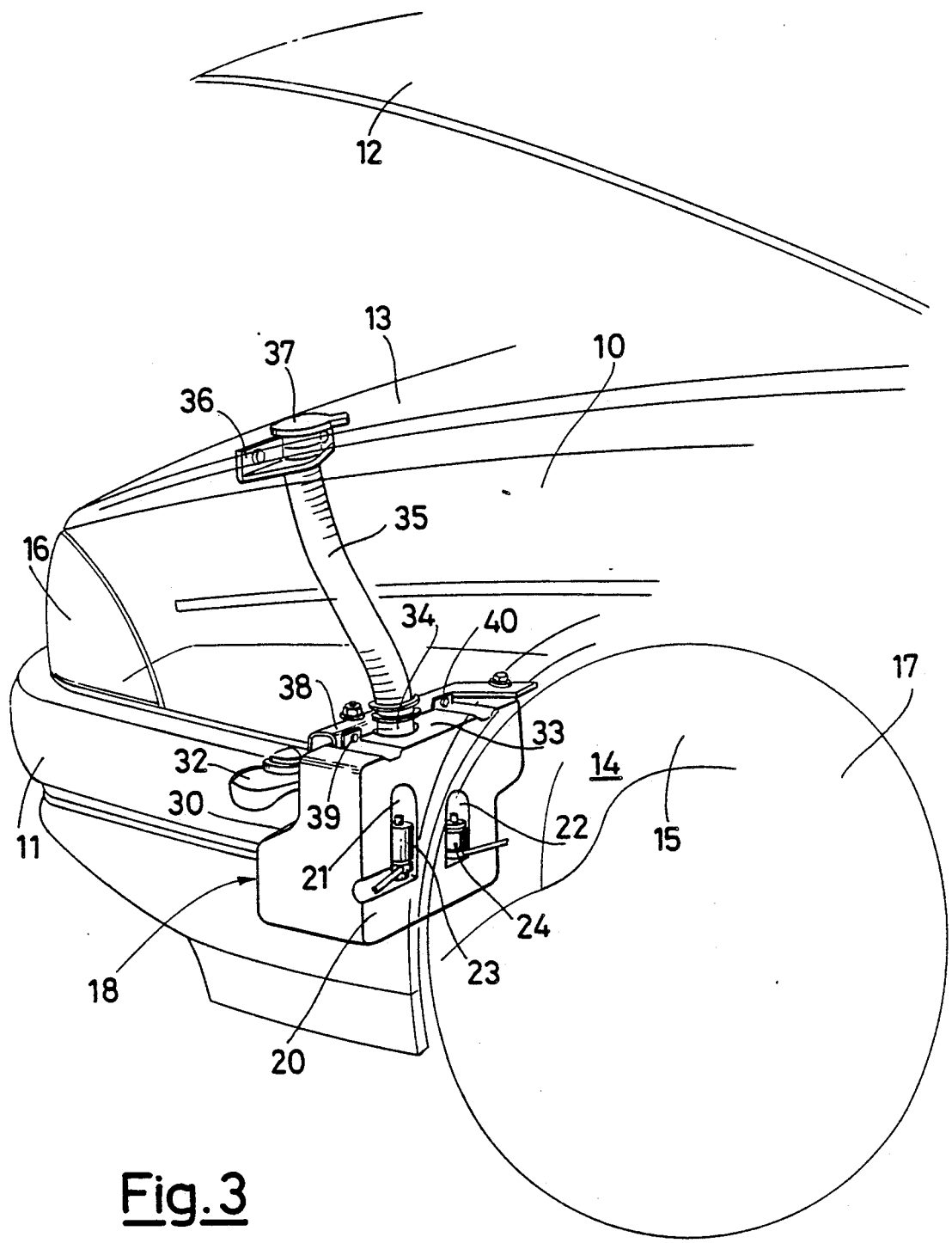
FIG. 3 is a side perspective view of the car and of the container of FIG. 1.

In FIG. 1 and 3, the fender 10 and the front bumper 11, the engine bay hood 12, the engine bay 13, a wheel box 14 and the related wall 15 of the inside valance panel of a car are partly shown; also a side blinker 16, one front wheel 17, the front grille 12' and one head lamp 16' are shown.

With 18 a container or tank for the windscreeen washing liquid, which in the embodiment shown is housed inside the wheel box 14 and is fastened on to the side wall 19 of the inside valance panel in a way which shall be disclosed hereinunder, is generally shown.

Figure 2:
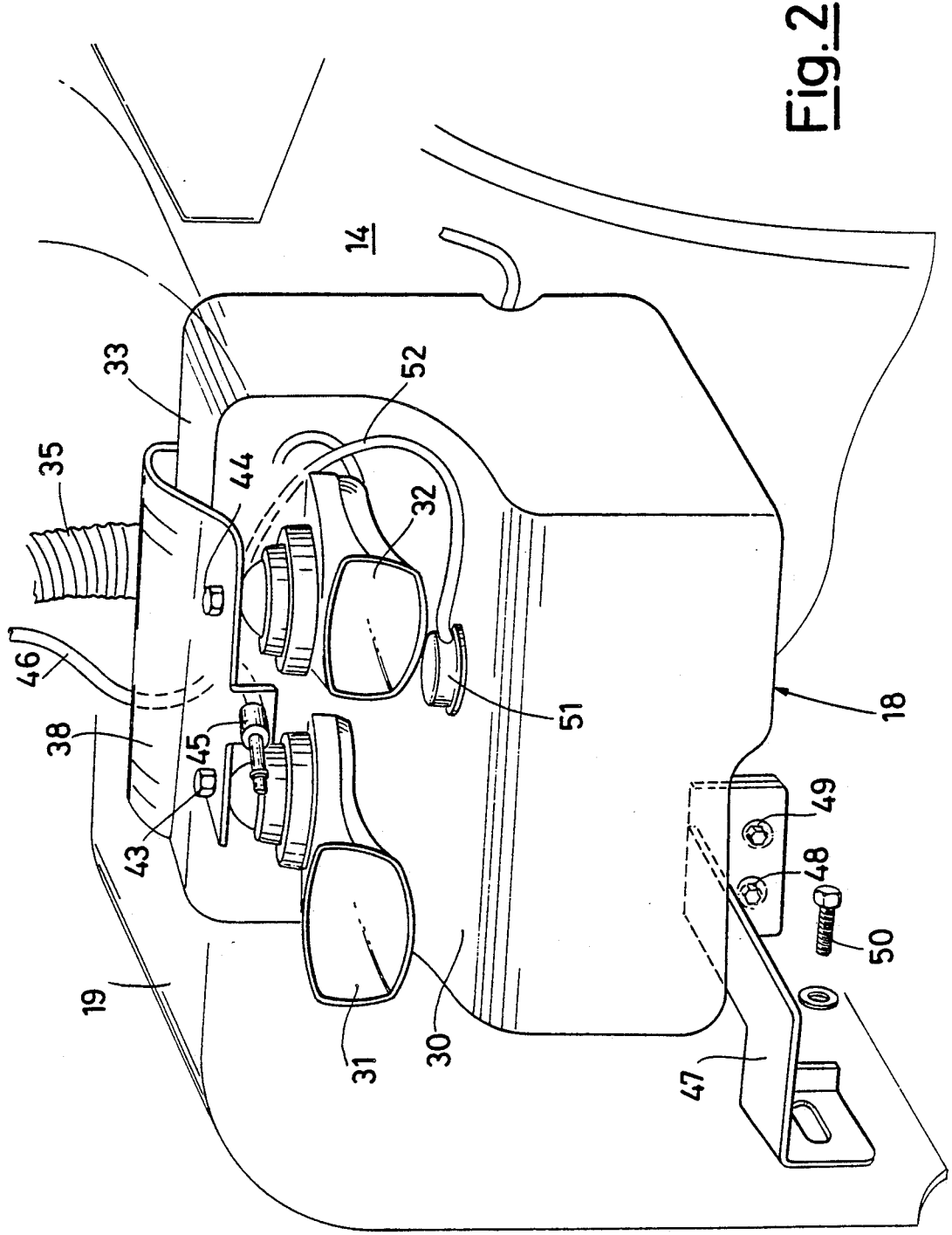
FIG. 2 is an enlarged front perspective view of the container of FIG. 1.

The container 18 has a substantially "L"-shaped structure, as it results also from FIGS. 2 and 4; the rear wall 20 of the container is provided with two niches 21 and 22, inside which electrical pumps 23 and 24, shown in greater detail in FIG. 4, which feed the windscreen washing liquid through hoses 25 and 26, respectively to the spray nozzles of the windscreen and of the head lamp washers, not shown, are housed.

With 27 and 28 electrical cables feeding the pumps 23 and 24, through the connector 29, are indicated.

The front wall 30 of the container 18 is bent to form a shelf, as it results clear from FIGS. 1 and 2, and forms a seat suitable to house the horns 31 and 32 of the hooters.

In the upper wall 33 of the container 18 the filler 34 is provided; to the filler 34 a flexible hose 35, which, passing through a suitable opening 34' of the wall 19 of the inside valance panel, leads into the engine bay 13, wherein it is supported by a bracket indicated with 36, is connected.

The cap for closing the hose 35 is indicated with 37.

To the upper wall 33 of the container 18 a bracket 38 is fastened by means of screws 39 and 40; in its turn, the bracket 38 allows fastening the container 18 onto the wall 19 of the inner valance panel by means of a threaded stud 41 and of a screw 42.

The bracket 38 constitutes the means to fasten the accessory devices, and protrudes above the said container seat, acting as the support for the horns 31 and 32, which are fastened by means of screws in 43 and 44, and for a sensor of room temperature, indicated with 45.

With 46 an electrical cable for connecting the sensor 45 to the connector 29 is indicated.

To the container 18 a small bracket 47 is moreover fastened by means of screws 48 and 49; the bracket 47 is destined to be fastened in its turn to the wall 19 by means of a screw 50, as it results from FIGS. 1 and 2.

In FIG. 2 also a detector 51 of the level of washing liquid, and the related conductor 52 are visible.

The container 18 is completed in an apposite working station, mounting on its structure the pumps 23 and 24, the brackets 38 and 47 and on the bracket 38 the horns 31 and 32, the sensor 45, the detector 51.

Then in the step of car's bodywork trimming, the container 18 is inserted in the recess of the wheel box 14 intended to house it, and fastened on to the bodywork by means of the brackets 38 and 47 and the related screws 41, 42 and 50. The flexible hose 35 is then connected to the filler 34 and fastened by means of the bracket 36, and the hoses 25 and 26 are connected to the spray nozzles of the the windscreeen and of the head lamps respectively.

Finally, to the connector 29 the cables are connected for the electrical feed to the pumps 23 and 24, of the horns 31 and 32, of the sensor 45 and of the detector 51.

As the container 18 already previously completed with the accessory devices in a separate working station, the time necessary for the assembly in the car results considerably reduced, to full advantage of the manufacturing costs of the same car.

I claim:

1. Container for the windscreen washing liquid of a car, said container being provided with a seat for the housing of car accessory devices, and fasteners associated with said container for fastening said accessory devices to container within said seat, and said accessory devices being constituted by the horns of the car.

2. Container for the windscreen washing liquid of a car, said container having a seat portion for housing car accessory devices, fastening means for securing the car accessory devices within said seat portion of said container, at least one niche being located remote from said seat portion for receiving at least one pump for suctioning of windscreen washing liquid, said container having a structural shape for mounting within a recess of a wheel box of the car, said structural shape of said container having a substantially "L"-shaped portion and a wall of said "L"-shaped portion providing said seat for housing the car accessory devices, and the car accessory devices being horns of the car.

* * * * *